US009208064B2

(12) United States Patent
Fryč et al.

(10) Patent No.: US 9,208,064 B2
(45) Date of Patent: Dec. 8, 2015

(54) DECLARATIVE TESTING USING DEPENDENCY INJECTION

(75) Inventors: Lukáš Fryč, Raleigh, NC (US); Pavol Pitonak, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 801 days.

(21) Appl. No.: 13/206,283

(22) Filed: Aug. 9, 2011

(65) Prior Publication Data
US 2013/0042152 A1 Feb. 14, 2013

(51) Int. Cl.
*G06F 11/36* (2006.01)

(52) U.S. Cl.
CPC ........ *G06F 11/3684* (2013.01); *G06F 11/3688* (2013.01); *G06F 11/3696* (2013.01); *G06F 11/3624* (2013.01)

(58) Field of Classification Search
CPC ............ G06F 11/3684; G06F 11/3688; G06F 11/3664; G06F 11/3672; G06F 11/3604; G06F 9/444; G06F 11/362; G06F 11/3612; G06F 11/3636; G06F 11/2215
USPC .................................. 714/38.1; 717/124, 126
See application file for complete search history.

(56) References Cited

U.S. PATENT DOCUMENTS

| | | | | |
|---|---|---|---|---|
| 4,802,834 | A * | 2/1989 | Neko | 425/138 |
| 6,477,666 | B1 * | 11/2002 | Sanchez et al. | 714/41 |
| 6,701,460 | B1 * | 3/2004 | Suwandi et al. | 714/41 |
| 6,971,048 | B1 * | 11/2005 | Hanson et al. | 714/41 |
| 7,020,803 | B2 * | 3/2006 | Wolin et al. | 714/41 |
| 7,203,881 | B1 * | 4/2007 | Williams et al. | 714/741 |
| 7,225,428 | B1 * | 5/2007 | Fetzer et al. | 717/124 |
| 7,404,107 | B2 * | 7/2008 | Burk | 714/41 |
| 7,406,628 | B2 * | 7/2008 | Edgar et al. | 714/43 |
| 7,516,025 | B1 * | 4/2009 | Williams et al. | 702/57 |
| 7,536,605 | B2 * | 5/2009 | Keaffaber et al. | 714/41 |
| 7,831,864 | B1 * | 11/2010 | Schoenthal et al. | 714/35 |
| 7,966,602 | B1 * | 6/2011 | Webster et al. | 717/114 |
| 8,127,277 | B2 * | 2/2012 | Albot et al. | 717/127 |
| 8,528,093 | B1 * | 9/2013 | Kureha et al. | 726/25 |
| 8,533,679 | B2 * | 9/2013 | Showalter et al. | 717/125 |
| 8,555,234 | B2 * | 10/2013 | Tremaine et al. | 716/136 |
| 8,650,447 | B1 * | 2/2014 | Wortman et al. | 714/724 |
| 8,752,027 | B2 * | 6/2014 | Noureddine et al. | 717/130 |
| 8,756,569 | B2 * | 6/2014 | Arcese | 717/124 |
| 8,826,243 | B2 * | 9/2014 | Dearing et al. | 717/130 |
| 8,886,999 | B2 * | 11/2014 | Ma et al. | 714/41 |
| 2004/0019457 | A1 * | 1/2004 | Arisha | 702/182 |
| 2004/0078696 | A1 * | 4/2004 | Bowers et al. | 714/41 |
| 2004/0243882 | A1 * | 12/2004 | Zhou | 714/38 |
| 2005/0015679 | A1 * | 1/2005 | Edgar et al. | 714/43 |
| 2005/0071818 | A1 * | 3/2005 | Reissman et al. | 717/127 |

(Continued)

*Primary Examiner* — Loan L. T. Truong
(74) *Attorney, Agent, or Firm* — Lowenstein Sandler LLP

(57) ABSTRACT

Methods and systems for declarative testing using dependency injection are described. In one embodiment, a computing system inspects a first annotation that declares an injection point in source code of a test subject and a second annotation that declares a set of test values to be injected at the injection point. The first and second annotations are metadata in an input domain and are added in a designated place in the source code. The computing system executes a test runner that creates a set of one or more tests during a configuration phase based on the inspection of the source code, including the first and second annotations. Each of the set of tests includes one of the test values injected at the injected point as declaratively provided by the second annotation. The set of tests are to be executed during a run phase.

26 Claims, 5 Drawing Sheets

(56) References Cited

U.S. PATENT DOCUMENTS

| | | | |
|---|---|---|---|
| 2006/0143540 A1* | 6/2006 | Burk | 714/41 |
| 2006/0271825 A1* | 11/2006 | Keaffaber et al. | 714/38 |
| 2008/0120602 A1* | 5/2008 | Comstock et al. | 717/125 |
| 2008/0215921 A1* | 9/2008 | Branca et al. | 714/38 |
| 2008/0215925 A1* | 9/2008 | Degenaro et al. | 714/41 |
| 2008/0295081 A1* | 11/2008 | Albot et al. | 717/128 |
| 2008/0307258 A1* | 12/2008 | Challenger et al. | 714/20 |
| 2009/0007077 A1* | 1/2009 | Musuvathi et al. | 717/130 |
| 2009/0193296 A1* | 7/2009 | Kellington et al. | 714/33 |
| 2009/0249148 A1* | 10/2009 | Ito et al. | 714/746 |
| 2009/0249291 A1* | 10/2009 | Bak et al. | 717/110 |
| 2010/0036661 A1* | 2/2010 | Boucher et al. | 704/235 |
| 2010/0070231 A1* | 3/2010 | Hanumant | 702/123 |
| 2010/0235807 A1* | 9/2010 | Doddappa et al. | 717/101 |
| 2010/0287412 A1* | 11/2010 | Cha et al. | 714/35 |
| 2010/0287535 A1* | 11/2010 | Kim et al. | 717/127 |
| 2010/0325620 A1* | 12/2010 | Rohde et al. | 717/154 |
| 2011/0055813 A1* | 3/2011 | Calendino et al. | 717/124 |
| 2011/0208469 A1* | 8/2011 | Sheye | 702/123 |
| 2011/0296242 A1* | 12/2011 | Elnozahy et al. | 714/26 |
| 2012/0174231 A1* | 7/2012 | Avritzer | 726/25 |
| 2013/0024846 A1* | 1/2013 | Lewis et al. | 717/130 |

\* cited by examiner

DECLARATIVE TESTING USING DEPENDENCY INJECTION

TECHNICAL FIELD

Embodiments of the present invention relate to declarative testing, and more specifically, to declarative testing using dependency injection.

BACKGROUND

Software implementation errors are one of the most significant contributors to information system security vulnerabilities, making software testing an essential part of system assurance. Exhaustive testing—testing all possible combinations of inputs and execution paths—is impossible for real-world software, so high assurance software is tested using methods that require extensive staff time and thus have enormous cost. For less critical software, budget constraints often limit the amount of testing that can be accomplished, increasing the risk of residual errors that lead to system failures and security weaknesses.

Web application Quality Assurance (QA) Engineers or test developers can use automated testing tools to test that the application components are performing as expected. For example, a user, such as a QA Engineer or test developer, can use the automated testing tool to develop test cases for testing components of an application. Although a tool can automate the execution of testing, a QA Engineer must manually define the test values to be used in the tests to be executed. Often times, these tests previously have been defined and the code and test descriptions for these tests have already been written. From practice it may be seen that these tests are often written with no re-usability of code in mind. Blocks of test code are often manually duplicated across the test suites. There is not a current mechanism that allows QA Engineers to define test values in a declarative manner, much less for the declarative combinatorial testing.

Combinatorial testing is a method that can reduce cost and increase the effectiveness of software testing for many applications. The key insight underlying this form of testing is that not every parameter contributes to every failure and most failures are caused by interactions between relatively few parameters. Combinatorial testing can be employed in all scenarios where it is necessary to verify that subject of testing is able to pass validation with more than one value of given variable, especially if there are several such variables. Current methods implemented in modern testing frameworks are often cumbersome.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
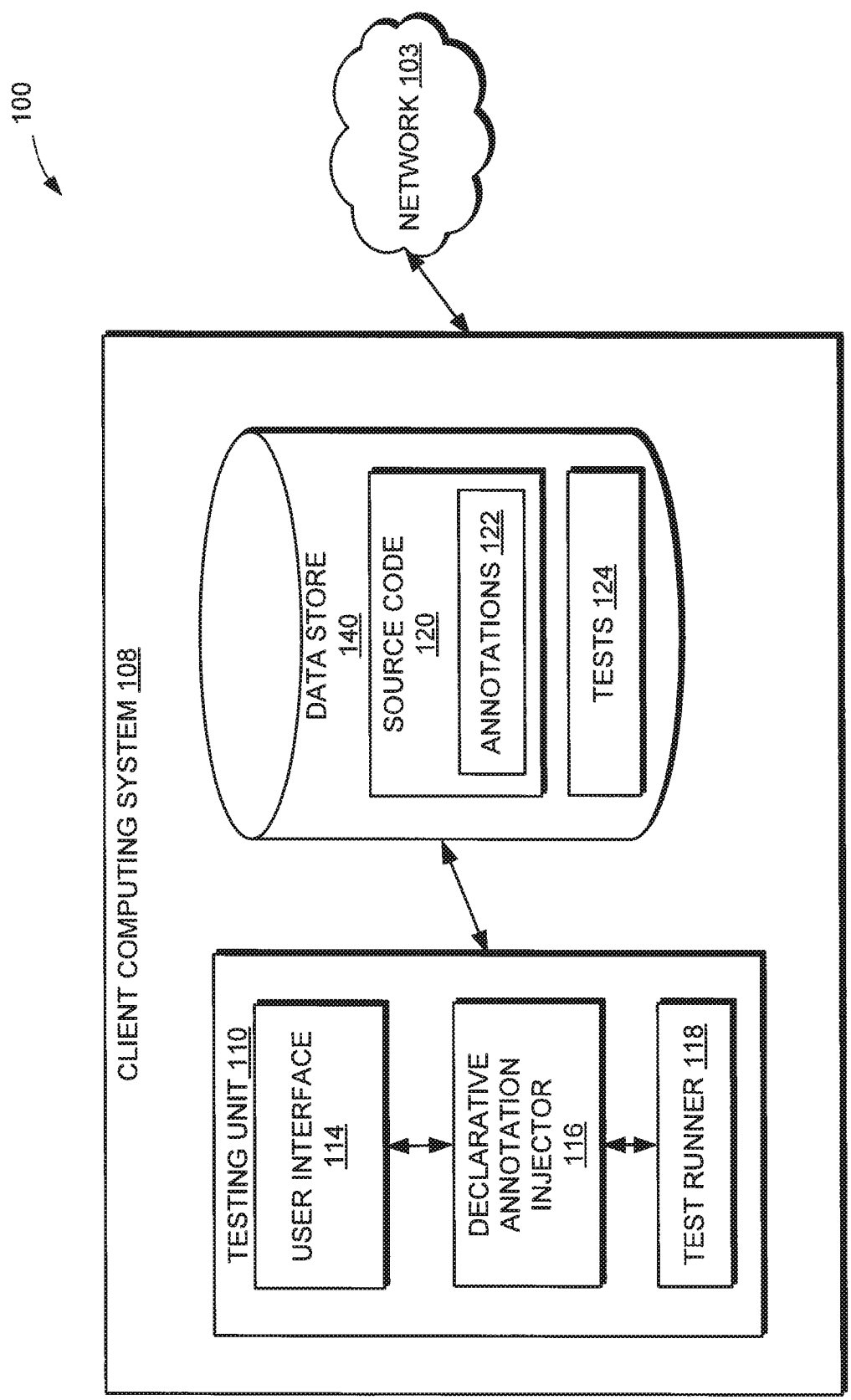
FIG. 1 is a block diagram of an exemplary testing environment in which embodiments of a declarative annotation injector may operate.

Methods and systems for declarative testing using dependency injection are described. In one embodiment, a computing system inspects a first annotation that declares an injection point in source code of a test subject and a second annotation that declares a set of test values to be injected at the injection point. The first and second annotations are metadata in an input domain and are added in a designated location in the source code. The computing system executes a test runner that creates a set of one or more tests during a configuration phase based on the inspection of the source code, including the first and second annotations. Each of the set of tests includes one of the test values injected at the injected point as declaratively provided by the second annotation. The set of tests are to be executed during a run phase.

The embodiments described herein provide an improved system that allows the use of annotations for dependency injection for declarative and declarative combinatorial testing. The annotations can declare the injection points in the source code, as well as what test values should be injected at the injection points. The embodiments described herein also allow multiple annotations to allow combinatorial testing. This provides a simpler method for development of tests and speeds up the process of testing frameworks. As described above, conventional solutions define the values to be tested, but the values are controlled programmatically, instead of in a declarative manner. In addition, it is more difficult to apply combinations programmatically, as opposed to defining them in a declarative manner. Also, as described above, combinatorial testing can be employed in all scenarios where it is necessary to verify that subject of testing is able to pass validation with more than one value of given variable, especially if there are several such variables. Current methods implemented in modern testing frameworks are often cumbersome. The embodiments described herein simplify combinatorial testing by employing features like dependency injection while describing values entering testing process declaratively.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "inspecting," "giving," "generating," "communicating," "capturing," "executing," "defining," "specifying," "creating," "recreating," "processing," "providing," "computing," "calculating," "determining," "displaying," "detecting," "sending," "receiving," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary testing environment 100 in which embodiments of a declarative annotation injector 116 may operate. The testing environment 100 may include a client computing system 108. The client computing system 108 may be one or more machines, including a desktop computer, laptop computer, server, cellular phone, personal digital assistant (PDA), etc. The client computing system 108 may be connected to a server computing system (not illustrated) or other computing devices via a network 103, which may be a private network (e.g., a local area network (LAN), wide area network (WAN), intranet, etc.) or a public network (e.g., the Internet). The server computing system may be one or more machines including one or more server computers, gateways, or other computing systems. In one embodiment, the client computing system 108 is a server of an enterprise, but is a "client" with respect to the server computing system 104. The client computing system 108 interacts with the server computing system by exchanging messages via standard protocols, e.g., FTP and HTTP.

In the depicted embodiment, the client computing system 108 executes a testing unit 110, which includes a user interface 114, the declarative annotation injector 116, and a test runner 118. In one embodiment, the declarative annotation injector 116 is integrated into the testing unit 110. In another embodiment, the declarative annotation injector 116 is implemented as a separate entity from the testing unit. The testing unit 110 is a process that tests source code 120 of a test subject to determine if the source code 120 is fit for use. The test subject may be an application, a process, a script, or the like. In another embodiment, the test subject is a unit, which is the smallest testable part of an application, such as a method in the application. A software developer can use the testing unit 110 to ensure that the source code meets its design requirements and behaves as intended. However, unlike manual testing, the testing unit 110 performs test automation. Test automation is the use of software to control the execution of tests 124, the comparison of predicted and actual results, creating of tests 124, defining test preconditions, and other test control, recording, and reporting functions. The testing unit 110 may implement code-driven testing that uses testing frameworks such as the xUnit frameworks, for example, JUnit, NUnit, and others, that allow testing of different elements (units) of software, such as functions and classes. For example, JUnit is a unit testing framework for the Java programming language, and is one of the family of xUnit testing frameworks. The main advantage of xUnit frameworks is that they provide an automated solution with no need to write the same tests many times. In another embodiment, the declarative annotation injector 116 may be integrated into the TestNG other testing units.

In the depicted embodiment, the declarative annotation injector 116 is configured to receive user input via the user interface 114 to add annotations 122 to the source code 120. The declarative annotation injector 116 may add annotations to declare injection points in the source code 120 and to declare values to be injected at the injection points. The annotations are metadata in an input domain and are added at designated locations in the source code. The annotations can be used for creating the tests 124. The test runner 118 is a tool configured to inspect the source code 120 with the annotations 122 and create a set of one or more tests during a configuration phase based on the inspection. The set of tests are created so that each of the tests includes one of the test values injected at the injection point as declaratively provided by the annotations. The test runner 118 is also configured to execute the set of tests during a run phase and may record the results of each of the set of tests. In another embodiment, another testing entity may execute the set of tests. As described herein, the annotations may be test class annotation on a level of type, a test property annotation on a level of field, a test method annotation on a level of method, etc. In one embodiment, the annotation defines the set of tests values. The test values may be single test values, an array of values, an array of primitives, a string-based pointer that points to the other field that defines a value or an array of values. The annotation may also include a type-safe link to an injection satisfier, or may be a user-defined annotation that defines the set of input values to use in the set of tests. Based on the inspection, the test runner 120 builds a final test suite configuration during the configuration phase that can be used by the test runner 120 (or other testing entity) to execute the set of tests during the run phase.

The client computing system 108 may also include a local data store 140, which can be one or more centralized data repositories that store the source code 120, the source code with annotations 122, the tests 124, application data, user data, configuration data, or the like. The local data store 140 may represent a single or multiple data structures (databases, repositories, files, etc.) residing on one or more mass storage devices, such as magnetic or optical storage based disks, tapes or hard drives. Although illustrated as being local to the client computing system 108, the local data store 140 may be remote from the client computing system 108 and the client computing system 108 can communicate with the remote data store over a public or private network, a bus, or the like.

A standard test class has one or more test methods. A standard test class definition may look like the following example:

```
class Test {
    void testMethod1 ( ) {
        Object testProperty1 = ...;
        ...
    }
}
```

In order to parameterize the test and repeat it several times, the items of the input domain inside the test method body can be solved iteratively.

For example, if the software developer is initializing testProperty1, more than one property will be needed, and the software developer will need to iterate over several properties, such as in the following example:

```
class Test {
    void testMethod1 ( ) {
        Object[ ] testProperties = ...;
        for (Object testProperty : testProperties) {
            ...
        }
    }
}
```

This principle, however, offends the isolation principle—when test fails before it iterates over all items from input domain, the software developer will not know anything about the items which have not been iterated. Although loops can be used, the nature of loops introduces further complexity into test methods.

Another method is the factory method, which is method inside the test class which populates the domain with the parameters of the test, or factory class which is the class which setups all the test classes, as illustrated in the following example:

```
class Test {
    void testMethod1(Object testProperty) {
        ...
    }
    Object[ ] getTestProperties( ) {
        ...
    }
}
```

In this case, the testProperty is taken from getTestProperties method (either by convention or configuration). Since both of these have the same base because they are written declaratively, the software developer is forced to create procedures which will generate test classes or generate inputs for him or her. Factories, however, are not readable and factories disrupt the natural appearance of the test class and break the simplicity of using factories. Therefore factories are not used as often as they could. Or the software developer may use test factor, as in the following example:

```
class Test {
    Object testProperty;
    void testMethod1( ) {
        ...
    }
}
class TestFactory {
    Test[ ] getConfiguredTests( ) {
        ...
    }
}
```

Test factory is a class which returns a sequence of tests configured for each run.

In view of the above methods, the embodiments described herein introduce declarative testing principle (instead of procedural) and metadata-based driven input domain. The main advantage over past solutions is keeping metadata about input domain in the natural placement in the source code. As described below, the declarative annotation injector 116 adds the annotations in designated locations in the source code. These principals may be applied to Java programming language, for example, using either JUnit or TestNG testing framework. Both of these frameworks works on a similar basis—they contain a test runner, which is responsible for reading test configuration (either from configuration files or directly from source code) and setup the set of tests which will be ran. After configuration phase, it is starting all the test cases (test methods) and records the result of each test case. The embodiments described herein enrich the configuration phase, as well as the run phase as described herein.

For annotations used for dependency injection, modern object-oriented languages contain annotations that act like metadata that defines additional semantic for objects. The metadata is not processed by compiler, but can be processed at runtime. One of the purposes where annotations can be successfully employed is dependency injection as part of inversion of control design pattern. Selected implementations of this pattern use annotations to declare injection points—fields, methods or constructors—whose values (parameters) should be satisfied by an external entity. Combinatorial testing can be employed wherever it is necessary to use more than one value to test a given subject. It may be used to extend coverage by introducing more values to test boundary cases. It may be also employed when need to validate the subject of testing from several points of view. Combinatorial testing is applicable in cases that need at most slightly changes to testing code in order to customize semantics of the test for given values.

The annotations can define an injection point and test values to be used for testing. Injection points are described by labeling with annotation constructs, such as @Inject. Once the injection point is defined, it is necessary to satisfy its value before the test is executed. For satisfaction of the injection point value it is possible to use annotations to mark a field or a static method which contains or produces the value or set of values to be used for testing. Annotation which points to injected values ("satisfying annotation") can be defined on a level of enclosing type, a field of enclosing type, a test method or alongside the injection point. It is not strictly necessary that a given type be able to satisfy a given value since it may be given to its descendants (extension types), especially in the case where an injection point is defined on abstract type. Satisfying annotation may contain directly injected values, or it may contain name of fields/methods holding values. Especially this annotation can point to the name of more than one field/method using regular expression as the name that matches several values. Also, the particular field/method can hold more than one value because it may be an array or collection of values (depends on language of implementation). The satisfying annotation can also have a special meaning which indicates that an injection point will be satisfied from an enumeration of type of injection point or it may instruct the test to use all the defined values, as well as non-values (empty reference, null value). The later case is suitable for cases where one of test methods does not require that a given injection point be satisfied (e.g., it does not use a given injection point or the value does not affect the result of the test). The special meaning may also indicate a default satisfying annotation which instructs the test to use the value which the injection points holds at the time of constructing enclosing type. The method of satisfaction may also use user-defined annotations, which may be side by side to the injection point. When processing the injection point, the test finds all the fields and static methods marked by that annotation, such as all of these defined values for satisfaction. The user-defined annotation may be marked by special annotation that instructs the test at runtime to process it (because the injection point can be marked by annotations which should not be processed). When using named satisfying annotations, it is also possible to use a convention over configuration mechanism that indicates that all of the fields/methods which names starts by the name of given field/method will be used for satisfaction. In a special case, the injecting values can define a range of values. This may be a matter of strategy to choose representatives values to be tested, such as values within a given range and values outside of the given range.

In one embodiment, once the injection points and appropriate satisfying values are defined, an external entity may be used to process annotations and to build a matrix of values used for testing. This configuration entity may be executed before the test is started and after each test method in order to achieve a change of configuration. Configuration of the set of tests should satisfy that all injected values are known before any given one of the set of tests is triggered, and thus, are deterministic, meaning the semantics of a given value is the same between two runs of the test. The configuration of test can determine an exact count of variables which are going to be configured for the set of tests.

In another embodiment, after processing annotations and building combinatorial matrix of values, it may be necessary to instruct the test that a given method will be repeated for each position in the matrix. For this purpose it is possible to employ features of particular testing framework or use code instrumentation to duplicate methods in enclosing type.

In other embodiments, combinatorial-space cutting strategies may be used. Because each test can define more than one injection point and each injection point can be satisfied by several values, the matrix of values can quickly become impossible to test. That is why this combinatorial-space can be cut by introducing a combinatorial testing strategy. For example, "all-singles" weak strategy or "all-pairs" strong strategy may be used. Alternatively, other combinatorial testing strategies may be used. For example, different strategies can be used for different purposes. For example, for a deeper validation of a test subject, a complete or mostly complete space of combinations (referred to as "all-pairs") may be tested, otherwise for quick evaluation (also referred to as smoke testing), it is possible to use strategy which tests each value at least once (referred to as "all-singles"). The embodiments described herein of declarative combinatorial testing may simplify combinatorial testing while keeping type-safety, meaning that the dependency injection configuration may be inspected before start of all test runs and it may be possible to stop testing, "fail fast," when configuration problem occurs.

Figure 2:
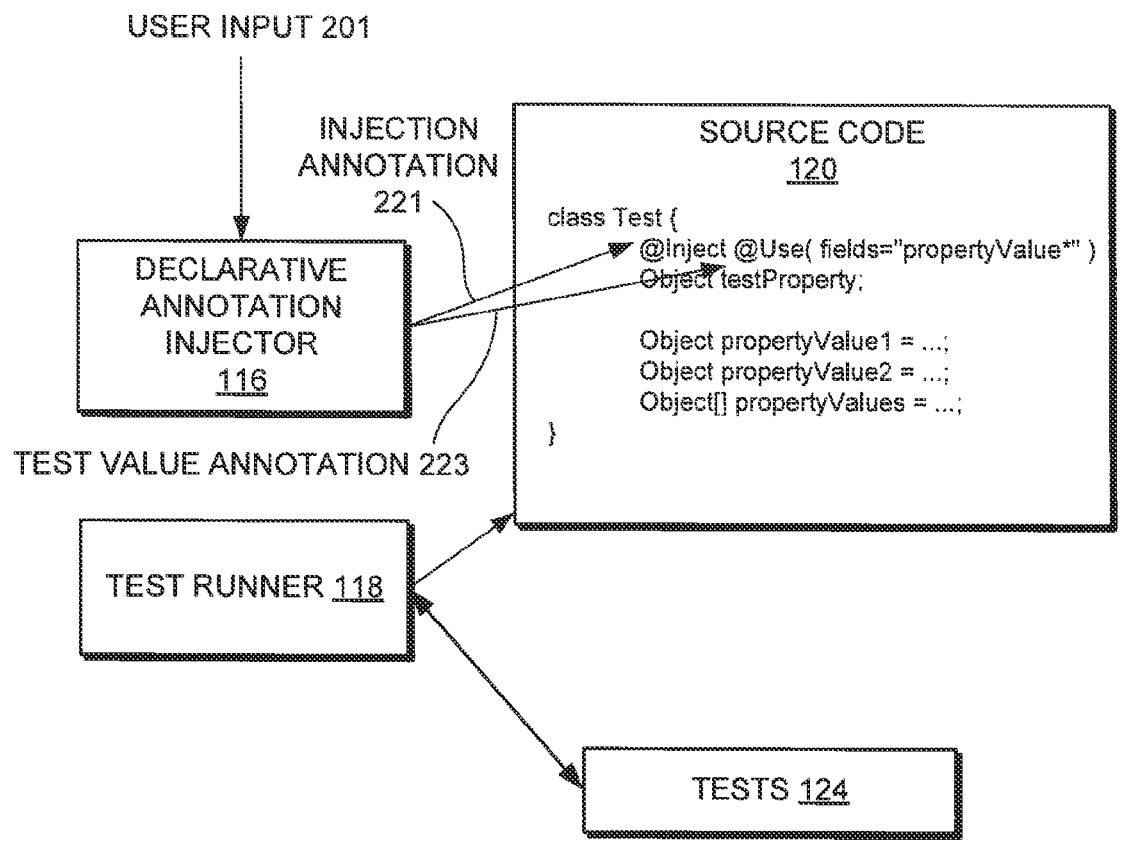
FIG. 2 illustrates the declarative annotation injector of FIG. 1 according to one embodiment.

FIG. 2 illustrates the declarative annotation injector 116 of FIG. 1 according to one embodiment. The declarative annotation injector 116 receives user input 201 that identifiers what annotations should be added to the source code 120 and where the annotations should be added within the source code 120, since the annotations are added in designated locations within the source code 120.

The embodiments described herein use similar principles as the factor class in that they create the test-class configurations for each input. The main difference here is using the test runner 120 to configure the test classes using the properties from the input domain declaratively provided by the annotations 122 placed in designated locations in the source code 120, such as illustrated in the following example:

```
class Test {
    @ Inject
    Object testProperty;
    void testMethod1( ) {
    }
}
```

By annotating testProperty with @Inject, the test property may be configured externally, or that software developer wants this property to be satisfied by an external configuration. This principle allows the software developer to check consistency in the configuration phase. Then another annotation is used to declare which values will be injected. For example, the software developer can declare the values in the following scenarios:

1. test class annotation (on the level of type)

```
@ Use(...)
class Test { ... }
```

2. test property annotation (the level of field)

```
@ Inject @ Use(...)
Object testProperty
```

3. test method annotation (the level of method)

```
@ Use(...)
void testMethod1( ) { ... }
```

The Annotation @Use is used above to indicate what values will be used to satisfy injection points. The actual value is dependent on programming language, but in the Java programming language, primitive types and strings and classes may be used.

The following examples are types of declarations that can be used in the annotations:

1. arrays of primitives

```
@ Use( ints={ 1, 2, 3 } )
@ Use( strings={ "one", "two", "three" } )
```

Alternatively, other primitives like floats or booleans may be used.

2. pointing to other fields by its name (which may be either value or array of values)

```
class Test {
    @ Inject @ Use( fields="propertyValue*" )
    Object testProperty;
    Object propertyValue1 = ...;
    Object propertyValue2 = ...;
    Object[ ] propertyValues = ...;
}
```

In the sample above, all of the values (propertyValue1, propertyValue2 and all of propertyValues) will be used as the input for test from given test class.

3. Last principle of configuration is using type-safe link to injection satisfier:

```
class Test {
    @ Inject @ Use( values=MyPropertyValue.class )
    Object testProperty;
    @ MyPropertyValue
    Object testPropertyValue1 = ...;
    @ MyPropertyValue
    Object[ ] testPropertyValues = ...;
}
```

The last principle may be suitable for scenarios when the software developer needs to declare values out of scope of this class and thus doesn't want use to string-based identified for pointing to another class. Instead, the software developer may use user-defined annotation @MyPropertyValue to define the values to use in test.

Referring back to depicted embodiment of FIG. 2, the declarative annotation injector 116 adds an injection annotation 221 (@Inject) within the class Test. The injection annotation 221 identifiers the injection point in the source code 120. The declarative annotation injector 116 also adds a test value annotation 223 (@Use) within the class Test. In the depicted embodiment, the test value annotation 223 indicates that all of the values (propertyValue1, propertyValue2 and all of propertyValues) will be used as the input for a test from given test class. In another embodiment, the test value annotations 223 can declare other values to be injected at the injection point. The test value annotation 223 can be a test class annotation (on the level of type), a test property annotation (the level of field), a test method annotation (the level of method), as set forth in the examples above.

Referring back to FIG. 2, once the declarative annotation injector 116 has added the annotations 221 and 223 to the source code 120, the test runner 118 can inspect the source code 120 with the annotations and create a set of tests 124, each test including one of the declared values injected at the injection point. The test runner 118 may also build a final test suite configuration to be used during the run phase. In the next phase, the run phase, the final test suite configuration is used by test runner 118 to run the test suite and before each method, the test runner 118 changes the injection points with appropriate value for the current test. During the run phase, in one embodiment, the test runner 118 sets a first test input at the injection point according to the final test suite configuration and executes a first test using the first test input at the injection point. The test runner 118 then changes the first test input to a second test input according to the final test suite configuration and executes a second test using the second test input at the injection point.

In another embodiment, the declarative annotation injector 116 can be used to inject multiple annotations for combinatorial testing. In these embodiments, the declarative annotation injector 116 annotates more than one test property with annotation @Inject, such as shown in the following example:

```
class Test {
    @ Inject
    Object testProperty;
    @ Inject
    Object otherProperty;
}
```

In this example, all of the combinations of input values of testProperty and otherProperty will be tested. In other embodiments, methods for cutting combinatorial space to limit the number of combination tests may be used to determine which tests will be run. In one embodiment, the declarative annotation injector 116 receives additional user input 201 to add additional annotations, such as an additional injection annotation that declares a second injection point in the source code 120, and another test value annotation that declares a second set of test values to be injected at the second injection point. These annotations, like those above, are metadata in the input domain and are added in a second designated location in the source code 120. The test runner 118 inspects the source code 120 with the annotations and creates the set of tests based on the inspection. In this embodiment, each of the sets of tests includes one of the set of tests values injected at the injection point as declaratively provided by the second annotation and one of the second set of test values injected at the second injection point as declaratively provided by the fourth annotation.

As described above, in one embodiment, all combinations of the test values from both sets may be tested. Alternatively, the test runner can run a subset of less than all of the combinations using combinatorial space cutting methods. In one embodiment, the test runner 118 defines a threshold number of tests to be run. This may be specified by the software developer. The test runner 118 selects a subset of the set of tests less than the threshold to limit a number of combinations of the set of test values and the second set of test values to be tested. The test runner 118 then executes the subset to test the limited number of combinations. Alternatively, other combinatorial space cutting methods may be used as would be appreciated by one of ordinary skill in the art having the benefit of this disclosure.

Figure 3A:
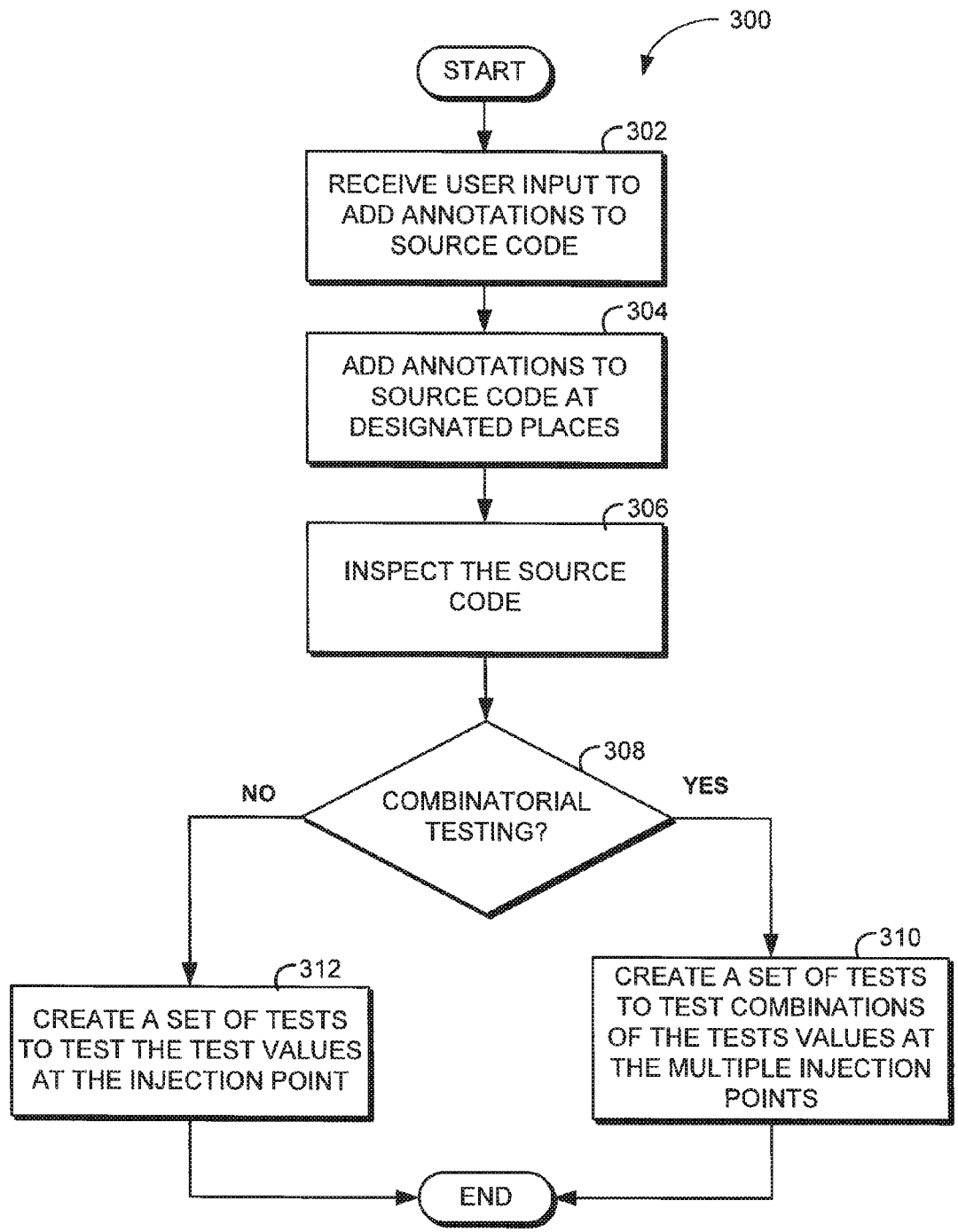
FIG. 3A is a flow diagram of one embodiment of a method of declarative annotation injection for declarative injection testing when creating a set of one or more tests.

FIG. 3A is a flow diagram of one embodiment of a method 300 of declarative annotation injection for declarative injection testing when creating a set of one or more tests. The method 300 is performed by processing logic that may comprise hardware (circuitry, dedicated logic, etc.), software (such as is run on a general purpose computing system or a dedicated machine), firmware (embedded software), or any combination thereof. In one embodiment, the testing unit 110 of FIG. 1 performs the method 300. In another embodiment, the declarative annotation injector 116 and test runner 118 of FIGS. 1 and 2 perform the method 300. Alternatively, other components of the client computing system 108 can perform some or all of the operations of method 300.

Referring to FIG. 3A, processing logic begins with receiving user input to add annotations to source code of a test subject (block 302). The processing logic adds the annotations to the source code at designated locations (block 304). The processing logic, during a configuration phase, inspects the source code, including the added annotations (block 306). The processing logic determines if the added annotations are being used for combinatorial testing, where multiple injection points have been declared (block 308). If multiple injection points are declared, the processing logic creates a set of tests to test combinations of the tests values declared at the multiple injection points (block 310); otherwise, the processing logic creates a set of tests with the declared values at the injection point (block 312), and the method 300 ends. As noted herein, the processing logic can create a set of tests to test all combinations at block 312. In another embodiment, the processing logic can create a set of tests that tests a subset of less than all of the combinations.

In one embodiment at block 302, the processing logic receives a first user input to add a first annotation to declare a first injection point in the source code, and a second user input to add a second annotation to declare a first set of test values to be injected at the first injection point. In another embodiment, the processing logic receives a third user input to add a third annotation to declare a second injection point in the source code and a fourth user input to add a fourth annotation to declare a second set of test values to be injected at the second injection point. As described herein, the first, second, third, and fourth annotations are metadata in the input domain and are added at designated places in the source code. At block 306, the processing logic inspects the source code, including the added annotations, and creates at block 310 or 312, a set of one or more tests during the configuration phase based on the inspections. At block 312, the processing logic creates a set of tests where each test includes one of the first set of test values injected at the injection point. At block 310, the processing logic creates a set of tests where each test includes a combination of one of the test values from the first set injected at the first injection point and one of the test values from the second set injected at the second injection point.

After the configuration phase, the processing logic can subsequently execute the set of tests during a run phase, and may record results of each of the set of tests. An embodiment of the run phase is illustrated and described below with respect to FIG. 3B. In one embodiment at block 310 or 312, the processing logic builds a final test suite configuration to be used when executing the tests during a run phase. The run phase may be performed by the processing logic or may be performed by processing logic of another computing system at a later point in time, for example.

Figure 3B:
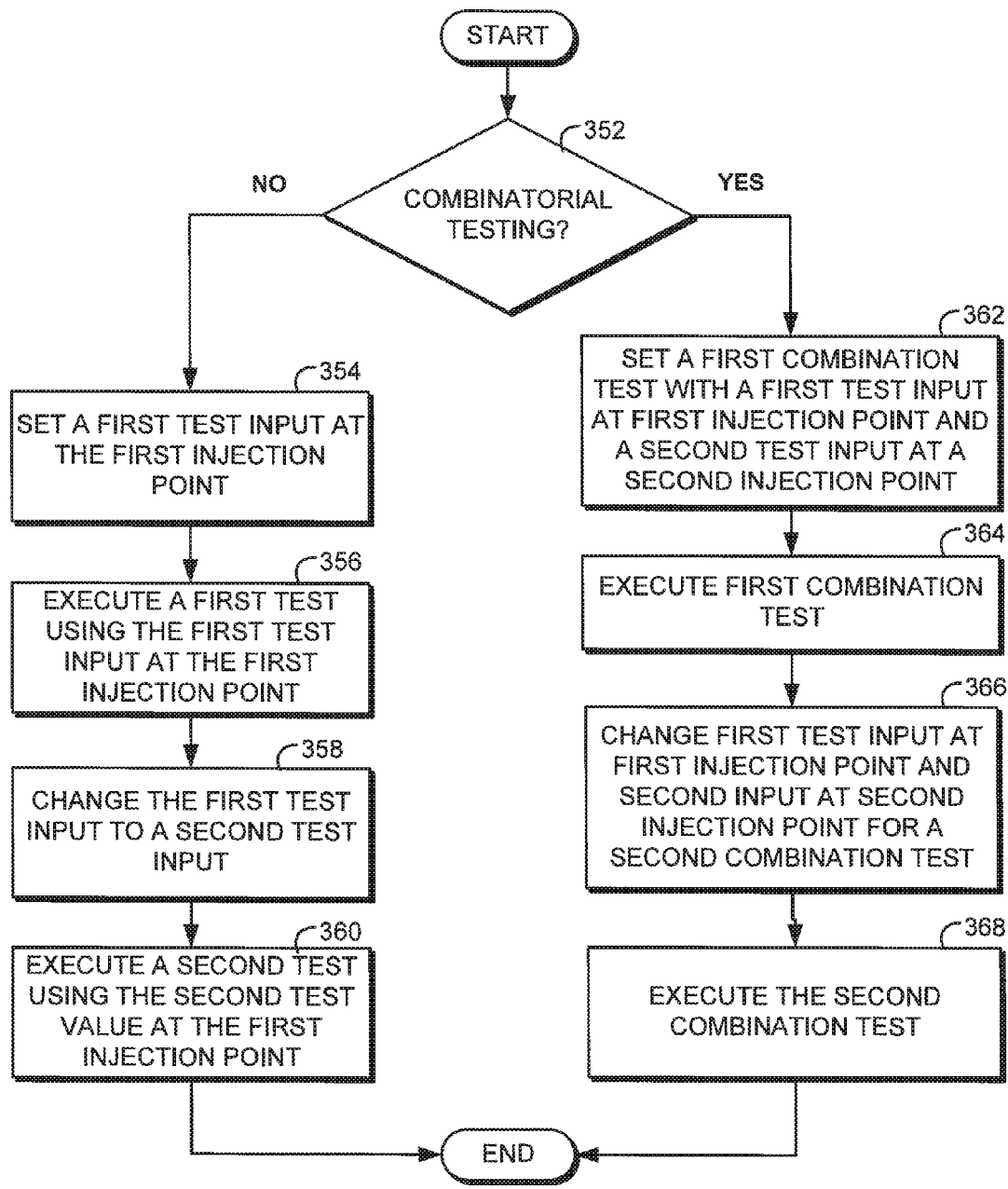
FIG. 3B is a flow diagram of one embodiment of a method of declarative injection testing.

FIG. 3B is a flow diagram of one embodiment of a method 350 of declarative injection testing. The method 350 is performed by processing logic that may comprise hardware (circuitry, dedicated logic, etc.), software (such as is run on a general purpose computing system or a dedicated machine), firmware (embedded software), or any combination thereof. In one embodiment, the testing unit 110 of FIG. 1 performs the method 350. In another embodiment, the test runner 118 of FIGS. 1 and 2 perform the method 350. Alternatively, other components of the client computing system 108 can perform some or all of the operations of method 350.

Referring to FIG. 3B, processing logic begins with determining whether the source code is being tested using combinatorial testing (block 352). If not, the processing logic sets a first test input at the first injection point (block 354), and executes a first test using the first test input at the first injection point (block 356). The processing logic changes the first test input to a second test input (block 358), and executes a second test using the second test value at the first injection point (block 356). Of course, if there are more than two values declared, the process repeats, otherwise, the method 350 ends. It should also be noted if there is only one value declared, only one test is executed.

If at block 352 the processing logic determines that combinatorial testing is being used, the processing logic sets a first combination test with a first test input at a first injection point and a second test input at a second injection point (block 362) and executes the first combination test (block 364). The processing logic logic then changes the first and second test inputs at the first and second injection points for a second combination test (block 366), and executes the second combination test (block 368). Of course, if there are more than two combinations based on the test values declared, the process repeats, otherwise, the method 350 ends. It should also be noted if there is only one combination based on the declared values, only one test is executed. It should also be noted that more than two injection points and corresponding declared values may be used. In one embodiment, the processing logic executes the set of tests to test all combinations of the set of test values declared at the declared injection points. In another embodiment, the processing logic executes a subset of less than all combinations. For example, in one embodiment, the processing logic defines a threshold number of tests to be run, and selects a subset of the set of tests that is less than the threshold number to limit a number of combinations of the set of tests values declared at the declared injection points. The processing logic then executes the subset to test the limited number of combinations.

Figure 4:
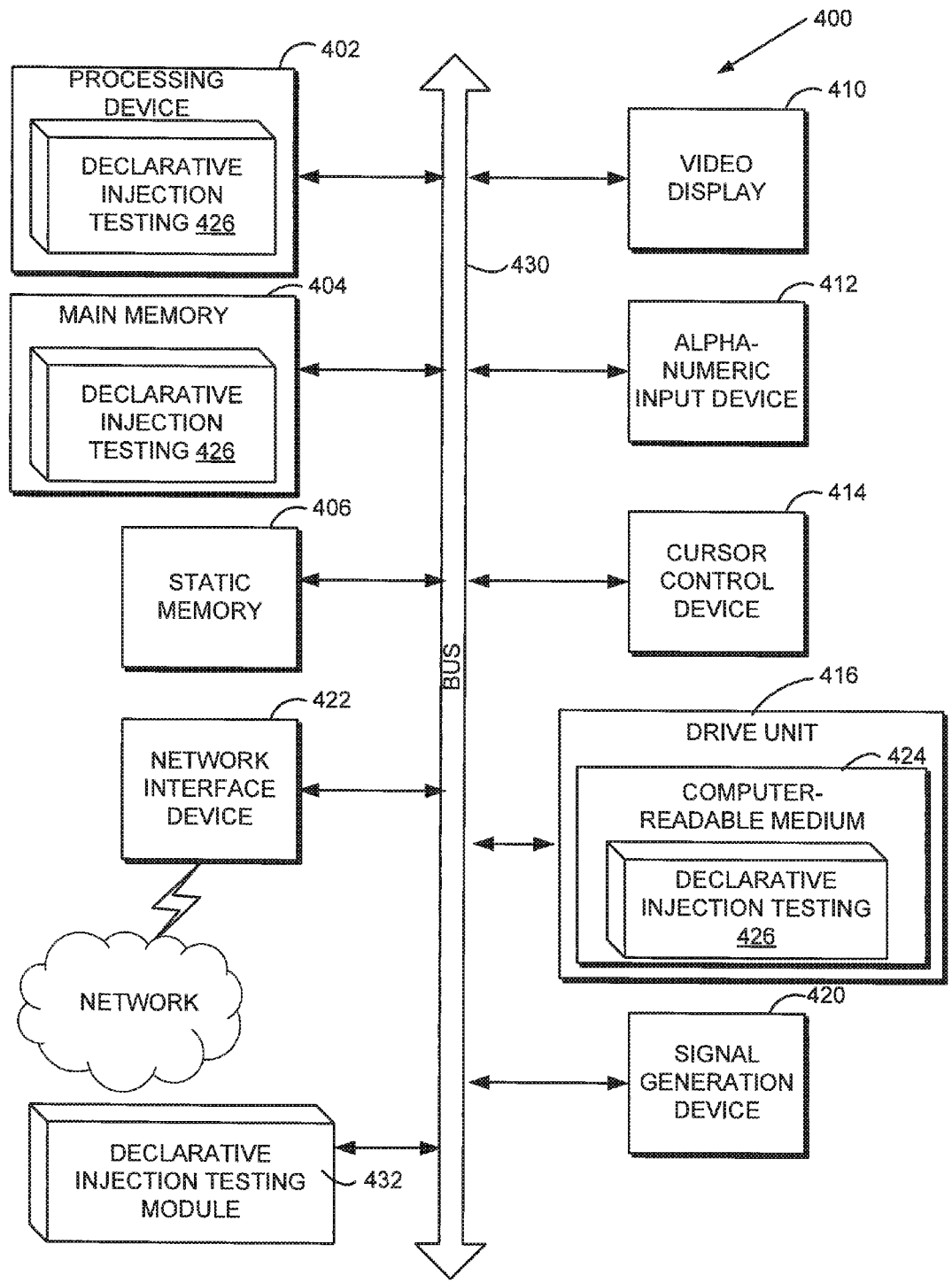
FIG. 4 illustrates a diagrammatic representation of a machine in the exemplary form of a computing system for declarative injection testing.

FIG. 4 illustrates a diagrammatic representation of a machine in the exemplary form of a computing system 400 for declarative injection testing. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for declarative injection testing, such as the methods 300 and 350 described above. In one embodiment, the computing system 400 represents various components that may be implemented in the client computing system 108 as described above. Alternatively, the client computing system 108 may include more or less components as illustrated in the computing system 400. In another embodiment, the computing system 400 represents various components that may be implemented in the server computing system 104.

The exemplary computing system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., declarative injection testing 426) for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., declarative injection testing 426) embodying any one or more of the methodologies or functions described herein. The declarative injection testing 426 may also reside, completely or at least partially, within the main memory 404 and/or within the processing device 402 during execution thereof by the computing system 400, the main memory 404 and the processing device 402 also constituting computer-readable storage media. The declarative injection testing 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The declarative injection testing module 432, components, and other features described herein (for example in relation to FIGS. 1-3) can be implemented as discrete hardware components or integrated in the functionality of hardware components such as ASICS, FPGAs, DSPs, or similar devices. The declarative injection testing module 432 may implement operations of declarative injection testing as described herein with respect to FIG. 4. In addition, the declarative injection testing module 432 can be implemented as firmware or functional circuitry within hardware devices. Further, the declarative injection testing module 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
    inspecting, by a processing device executing a test runner, source code of a test subject, the source code comprising first, second, third, and fourth annotations, wherein the first annotation to declare an injection point in the source code, the second annotation to declare a set of test values to be injected at the injection point, the third annotation to declare a second injection point in the source code, and the fourth annotation to declare a second set of test values to be injected at the second injection point, wherein the first, second, third, and fourth annotations are metadata in an input domain and are added at designated places in the source code; and
    creating, by the test runner, a set of one or more combination tests during a configuration phase in view of said inspection, wherein each of the set of combination tests comprises a combination of one of the set of test values injected at the injection point as declaratively provided by the second annotation and one of the second set of test values injected at the second injection point as declaratively provided by the fourth annotation, wherein the set of combination tests is to be executed during a run phase.

2. The method of claim 1, wherein said inspecting comprises:
    inspecting, by the test runner, the first annotation in the source code to determine the injection point to be tested; and
    inspecting, by the test runner, the second annotation in the source code to determine the set of test values to be injected at the injection point, wherein the set of tests are created by the test runner in view of the inspections of the first and second annotations.

3. The method of claim 1, further comprising:
    executing, by the test runner, the set of one or more tests during the run phase; and
    recording results of each of the set of tests.

4. The method of claim 1, further comprising declaring the second annotation as a test class annotation on a level of type.

5. The method of claim 1, further comprising declaring the second annotation as a test property annotation on a level of field.

6. The method of claim 1, further comprising declaring the second annotation as a test method annotation on a level of method.

7. The method of claim 1, wherein the second annotation comprises an array of primitives.

8. The method of claim 1, wherein the second annotation comprises a string-based pointer that points to other fields, wherein the other fields define a value or an array of values.

9. The method of claim 1, wherein the second annotation comprises a type-safe link to an injection satisfier.

10. The method of claim 1, wherein the second annotation is a user-defined annotation that defines the set of test values to use in the set of tests.

11. The method of claim 1 wherein said creating comprises building a final test suite configuration.

12. The method of claim 1,
    wherein said inspecting comprises inspecting the source code, comprising the first, second, third, and fourth annotations, by the test runner, and
    wherein said creating comprises creating the set of one or more tests during the configuration phase in view of said inspection.

13. The method of claim 12, wherein said inspecting comprises:
    inspecting, by the test runner, the third annotation in the source code to determine the second injection point to be tested; and
    inspecting, by the test runner, the fourth annotation in the source code to determine the second set of test values to be injected at the second injection point, wherein the second set of tests are created by the test runner in view of the inspections of the third and fourth annotations.

14. A method comprising:
    executing, by a processing device executing test runner, a set of combination tests created during a configuration phase, the set of combination tests created being described in a final test suite configuration built during the configuration phase in view of source code of a test subject comprising first, second, third, and fourth annotations, wherein the first annotation is to declare an injection point in the source code, the second annotation is to declare a set of test values to be injected at the injection point, the third annotation to declare a second injection point in the source code, and the fourth annotation to declare a second set of test values to be injected at the second injection point, wherein the first, second, third, and fourth annotations are metadata in an input domain and are added at designated places in the source code, and wherein each of the set of combination tests comprises a combination of one of the set of test values injected at the injection point as declaratively provided by the second annotation and one of the second set of test values injected at the second injection point as declaratively provided by the fourth annotation;

setting, by the test runner, a first test input of a set of inputs at the injection point according to the final test suite configuration;

executing a first of the set of combination tests by the test runner using the first test input at the injection point;

changing the first test input to a second test input according to the final test suite configuration; and executing a second of the set of combination tests by the test runner using the second test input at the injection point.

15. The method of claim 14, wherein said executing comprises executing the set of one or more combination tests during a run phase to test all combinations of the set of test values and the second set of test values.

16. The method of claim 15, further comprising:
defining a threshold number of tests to be run by the test runner;
selecting a subset of the set of tests less than the threshold to limit a number of combinations of the set of test values and the second set of test values to be tested; and
executing, by the test runner, the subset to test the limited number of combinations.

17. A non-transitory computer readable storage medium comprising instructions that, when executed by a processing device of a computing system, cause the processing device to:
inspect, by the processing device executing a test runner, source code of a test subject, the source code comprising first, second, third, and fourth annotations, wherein the first annotation to declare an injection point in the source code and the second annotation to declare a set of test values to be injected at the injection point, the third annotation to declare a second injection point in the source code, and the fourth annotation to declare a second set of test values to be injected at the second injection point, wherein the first, second, third, and fourth annotations are metadata in an input domain and are added at designated places in the source code; and
create, by the test runner, a set of one or more combination tests during a configuration phase in view of said inspection, wherein each of the set of combination tests comprises a combination of one of the set of test values injected at the injection point as declaratively provided by the second annotation and one of the second set of test values injected at the second injection point as declaratively provided by the fourth annotation, wherein the set of combination tests is to be executed during a run phase.

18. The non-transitory computer readable storage medium of claim 17,
wherein to inspect the source code, the processing device is to inspect the source code, comprising the first, second, third, and fourth annotations, by the test runner, and
wherein to create the set of one or more tests, the processing device is to create the set of one or more tests during the configuration phase in view of said inspection.

19. A non-transitory computer readable storage medium comprising instructions that, when executed by a processing device of a computing system, cause the processing device to:
execute, by the processing device executing a test runner, a set of combination tests created during a configuration phase, the set of combination tests created being described in a final test suite configuration built during the configuration phase in view of source code of a test subject comprising first, second, third, and fourth annotations, wherein the first annotation is to declare an injection point in the source code, the second annotation is to declare a set of test values to be injected at the injection point, the third annotation to declare a second injection point in the source code, and the fourth annotation to declare a second set of test values to be injected at the second injection point, wherein the first, second, third, and fourth annotations are metadata in an input domain and are added at designated places in the source code, and wherein each of the set of combination tests comprises a combination of one of the set of test values injected at the injection point as declaratively provided by the second annotation and one of the second set of test values injected at the second injection point as declaratively provided by the fourth annotation;
set, by the test runner, a first test input of a set of inputs at the injection point according to the final test suite configuration;
execute a first of the set of tests by the test runner using the first test input at the injection point;
change the first test input to a second test input according to the final test suite configuration; and
execute a second of the set of tests by the test runner using the second test input at the injection point.

20. The non-transitory computer readable storage medium of claim 19, wherein to execute, the processing device is to execute the set of one or more tests during the run phase to test all combinations of the set of test values and the second set of test values.

21. The non-transitory computer readable storage medium of claim 20, wherein the processing device is further to:
define a threshold number of tests to be run by the test runner;
select a subset of the set of tests less than the threshold to limit a number of combinations of the set of test values and the second set of test values to be tested; and
execute, by the test runner, the subset to test the limited number of combinations.

22. A client computing system, comprising:
a data storage device to store source code of a test object, wherein the source code comprises a first annotation that declares an injection point in source code, a second annotation that declares a set of test values to be injected at the injection point, a third annotation to declare a second injection point in the source code, and a fourth annotation to declare a second set of test values to be injected at the second injection point, wherein the first, second, third, and fourth annotations are metadata in an input domain and are added at designated places in the source code; and a processing device, coupled to the data storage device, to execute a test runner, wherein the processing device is to:
inspect the source code, comprising the first and second annotations, using the test runner; and
create, by the test runner, a set of one or more combination tests during a configuration phase in view of the inspection of the source code, wherein each of the set of combination tests comprises a combination of one of the set of test values injected at the injection point as declaratively provided by the second annotation and one of the second set of test values injected at the second injection point as declaratively provided by the fourth annotation, wherein the set of combination tests is to be executed during a run phase.

23. The client computing system of claim 22, wherein the processing device is further to execute the set of tests during the run phase and record results of each of the set of tests.

24. The method of claim 1, wherein creating the set of one or more combination tests comprises:
building a matrix of all possible combinations of the set of test values from the second annotation and the set of test values from the fourth annotation, wherein each position in the matrix comprises one of the possible combinations;
selecting one or more of the positions from the matrix of combinations; and
creating the set of one or more combination tests using the combinations of test values from the selected positions of the matrix of combinations.

25. The non-transitory computer readable storage medium of claim 17, wherein to create the set of one or more combination tests, the processing device is to:
build a matrix of all possible combinations of the set of test values from the second annotation and the set of test values from the fourth annotation, wherein each position in the matrix comprises one of the possible combinations;
select one or more of the positions from the matrix of combinations; and
create the set of one or more combination tests using the combinations of test values from the selected positions of the matrix of combinations.

26. The client computing system of claim 22, wherein to create the set of one or more combination tests, the processing device is to:
build a matrix of all possible combinations of the set of test values from the second annotation and the set of test values from the fourth annotation, wherein each position in the matrix comprises one of the possible combinations;
select one or more of the positions from the matrix of combinations; and
create the set of one or more combination tests using the combinations of test values from the selected positions of the matrix of combinations.

\* \* \* \* \*